United States Patent

Marahashi

[15] 3,646,531

[45] Feb. 29, 1972

[54] MAGNETIC CORE SIGNAL DISCRIMINATION METHOD

[72] Inventor: Seishin Marahashi, San Jose, Calif.

[73] Assignee: Core Memories, Inc., Mountain View, Calif.

[22] Filed: Oct. 10, 1969

[21] Appl. No.: 865,373

[52] U.S. Cl...............340/174 DC, 340/174 CR, 340/174 M, 340/174 DA, 340/174 AC

[51] Int. Cl......................G11c 7/02, G11c 11/06, G11c 5/02

[58] Field of Search.................340/174 CR, 174 DA, 174 M, 340/174 AC, 174 DC

[56] References Cited

UNITED STATES PATENTS 3,115,619 12/1963 Barrett et al............................340/174
3,015,809 1/1962 Myers....................................340/174

*Primary Examiner*—Stanley M. Urynowicz, Jr.
*Attorney*—Spensley and Horn

[57] ABSTRACT

A ferrite core signal discriminating system is disclosed which uses a variable threshold for more accurate signal discrimination. A threshold control amplifier provides a time dependent threshold level to a discriminator with a high static level during initial read drive current periods and an exponentially decreasing level following the peak of noise and before peaks of ensuing core switching periods to improve discrimination of signal from noise.

1 Claims, 3 Drawing Figures

INVENTOR.
SEISHIN MURAHASHI
BY Lindenberg & Freilich
ATTORNEYS

INVENTOR.
SEISHIN MURAHASHI
BY Lindenberg & Freilich
ATTORNEYS

MAGNETIC CORE SIGNAL DISCRIMINATION METHOD

BACKGROUND OF THE INVENTION

This invention relates to an improved method and apparatus for ferrite core signal discrimination.

In some conventional ferrite core memories, differential amplifiers are connected to core sense windings to amplify the turnover output signals of the cores and eliminate the comparatively large common-mode signals present during a read operation. Full-wave rectifiers and threshold detectors are connected to output terminals of the amplifiers to discriminate between bit-0 and bit-1 output signals of the cores. In other conventional memories, dual voltage comparators are employed in place of the differential amplifiers. The threshold voltage is then applied directly to the comparators. This use of dual comparators is equivalent to the use of differential amplifiers with rectifiers and threshold detectors, but the use of comparators has the advantage that the accuracy of the output is only affected by the offset voltages of the comparators.

The limited signal-to-noise ratio of the sense signal produced in the core array is due to partial select noise signals, which are commonly called zero signals, induced in the sense winding by the read drive currents through unselected cores. It is common practice to so thread the sense winding through the cores that zero noise signals induced by partially selected cores will cancel, leaving only the switching (turnover) signal or zero signal induced in the sense winding by the selected core. However, zero noises produced by half-selected cores do not cancel out perfectly. Due to nonsymmetrical characteristics of core hysteresis curve (B-H curve), delta noise results as a noncancelled noise signal. This delta noise becomes substantially high in amplitude and may be comparable to an uncancelled zero noise signal. Thus this delta noise may either add to or subtract from the sense signals, i.e., "-zero" or "one" (core-turnover signal).

If the threshold level of the detector, or voltage comparator, is set sufficiently high to avoid mistaking delta noise for a bit 1, a low bit-1 signal induced in the sense winding by turnover of the selected core may go undetected unless all of the cores are carefully chosen to produce a turnover output signal of a minimum amplitude greater than the maximum delta noise to be expected.

In the past, a low signal-to-noise ratio has been tolerated by rejecting cores which will not produce a sufficiently high turnover signal. Although this has produced successful core memories, it does result in a high rejection rate of cores. Accordingly, an object of this invention is to provide a technique for discriminating core turnover signals from noise signals in a ferrite core signal environment. Another object is to provide apparatus for an improved ferrite core signal discriminator.

SUMMARY OF THE INVENTION

These and other objects of the invention are achieved by providing a high threshold level in a signal discriminator during the read drive period of a ferrite core to thereby discriminate against a high level of noise, and thereafter providing a time-dependent decrease of the threshold level such that the actual threshold level follows approximately the locus of the optimum signal-to-noise ratio between the lowest turnover signal and the highest noise signal expected.

The novel features that are considered characteristic of this invention are set forth with particularity in the appended claims. The invention will best be understood from the following description when read in connection with the accompanying drawings.

DESCRIPTION OF THE PREFERRED EMBODIMENT

Figure 1:
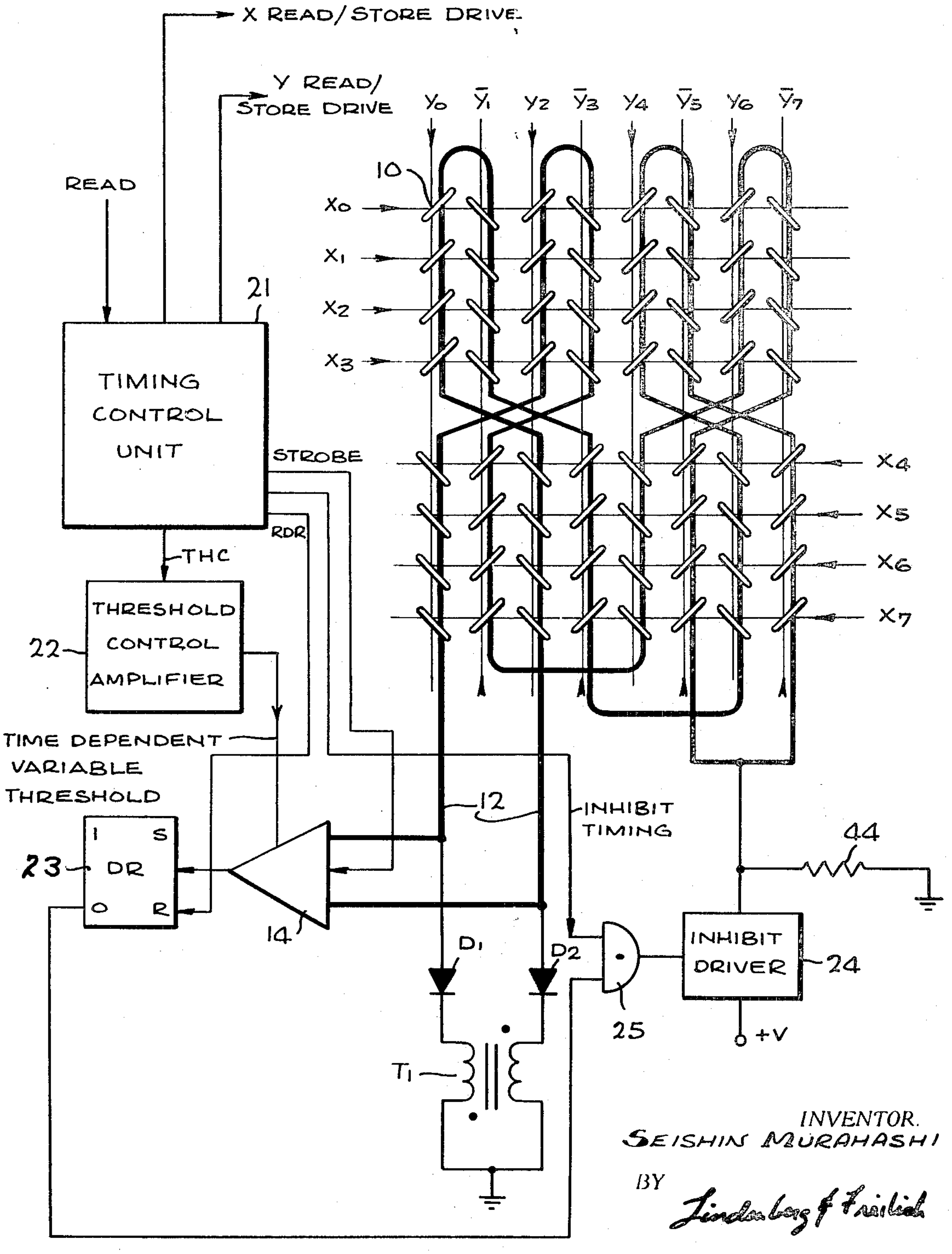
FIG. 1 is a schematic diagram of an exemplary coincident-current core memory plane having an improved signal-to-noise ratio in accordance with the present invention.

FIG. 1 illustrates a typical plane of a core memory consisting of an array of 64 cores which may be selectively set to store a binary one in response to positive drive currents, such as drive currents in Xo and Yo windings in the directions indicated to store a binary one in a core 10. Thereafter, to read out the binary one stored, the core 10 is switched by negative coincident currents through the Xo and Yo windings, thereby inducing an output pulse in a sense winding 12 which is threaded through all of the cores in the plane with the sense (direction) of the winding reversed in half of the cores in a given column in order that half-select ("zero" noise) signals induced in the sense winding by the unselected cores of a given column due to negative Y drive current will cancel.

To read out a binary digit stored in a given core, such as the core 10, coincident half-select negative drive currents are applied to its X and Y windings. When these drive currents are applied, half select signals are generated from the seven unselected cores in each of the row and column of the core 10. These half-select signals tend to cancel each other within the sense winding, if the information pattern in the core plane is all "1" or "zero" or other "nonworst case" pattern. This cancellation results from interleaved core-cant angle and strategic manner in which the sense-inhibit winding is wound in relation to X and Y windings. However, due to nonlinearity of the core B-H characteristic about its remanent state, noise generated by the half-select current in the core containing "zero" information is different in amplitude and waveform from that noise generated in the core containing "one" information. This slight, but nonnegligible noise difference resulting from a pair of cores having "one" and "zero" information each is called "delta" noise.

For any core plane configuration with any X, Y and inhibit-sense winding, there is an information pattern in the core which results in a maximum number of uncancelled noise or a maximum amount of delta noise. This information pattern is called the worst-case" pattern.

Thus for a 64 core plane, if it contains the worst-case pattern, the selection of core 10 results in 7 delta noises resulting from the 14 half-selected cores. The sense signal which appears across the sense winding, therefore, is either core turnover "one" signal from core 10 plus or minus 7 delta noises or "zero" signal from core 10 plus or minus 7 delta noises, depending on the information core 10 has stored. As the size of the array is expanded, added rows and columns provide additional worst-case noise. For example, a core plane of 64 core rows by 64 core columns produces 63 delta noises adding or subtracting from the signal from the selected core. Sixty-three delta noises constitute a substantial voltage amplitude, often as large as a low output "one" signal. Fortunately, these delta noises result mostly from the reversible flux change. Therefore, they occur due to changing drive current. The core switching signal, or "one" signal is the result of the amplitude of applied current. Thus the peak of delta noise occurs substantially earlier than the peak of the core turnover signal.

Figure 3:
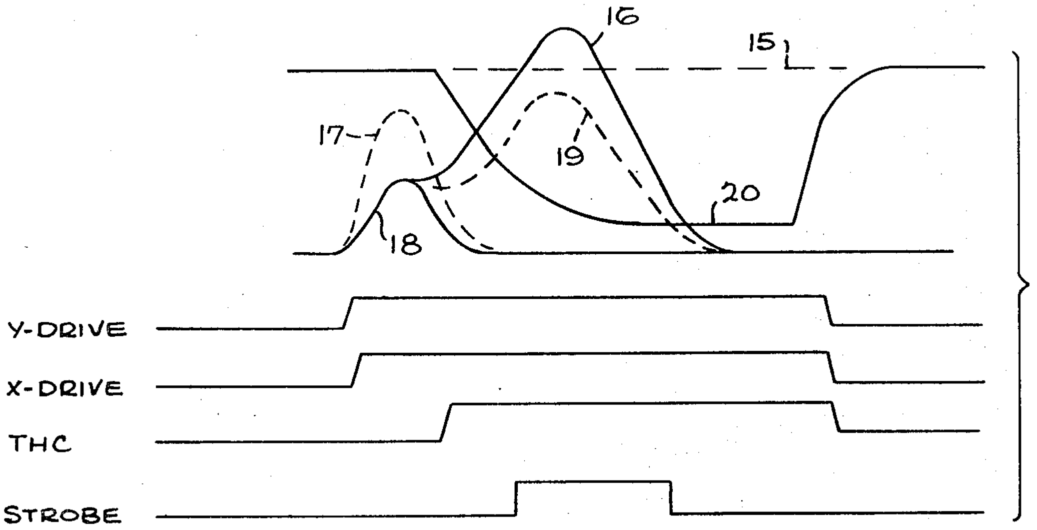
FIG. 3 is a timing diagram useful in understanding the basic concepts of the present invention and the operation of the exemplary embodiment illustrated in FIG. 2.

The conventional signal discriminating technique is to set an optimum DC threshold level in a discriminator 14 and time a strobe pulse to occur at or near the peaking time of the core turnover signal. If such a constant threshold level is employed to reject noise, a low level bit-1 signal may go undetected. To illustrate, FIG. 3 shows a dotted line 15 representative of a high DC threshold level necessary to discriminate between a normal bit-1 signal represented by the solid-line waveform 16 from a high delta noise plus zero signal represented by a dotted-line waveform 17. Such a high threshold level will successfully discriminate between normal bit-1 signals and noise signals ranging from the normal level indicated by a solid-line waveform 18 to a high delta noise signal indicated by a dotted-line waveform 17. However, low bit-1 signals represented by the dottedmline waveform 19 will then be interpreted as bit-0 signals by the signal discriminator 14.

To reduce the amplitude of the high delta noise signal 17, it is possible to provide one of the half-select currents sufficiently before the other to allow delta noise induced by it to subside before the other half-select current is applied. But that solution increases the memory access time significantly. Accordingly, the present invention provides an improved technique of discriminating core turnover signals in a high delta noise and zero noise environment.

To improve the discrimination of signal from noise in accordance with the present invention, the threshold level 17 is maintained high at the level 15 for a period of time sufficient for the peak of a high delta noise and zero signal to pass. The threshold level is then decreased to a low level 20. The rate at which the level is decreased is so chosen that the actual threshold level follows approximately the locus of an optimum signal-to-noise ratio for a wide variation of bit-1 signals, such as signal 19 to delta noise signal 17. Thus the time-dependent discriminating threshold level takes advantage of a varying signal-to-noise ratio of the actual sense signal from the core array, and in a practical embodiment the locus is a level which decays exponentially starting at a time after the noise signal begins to decay.

A timing control unit 21 shown in FIG. 1 provides X and Y drive signals to trigger a threshold control amplifier 22 at the correct time for the actual threshold level to start decaying from a high level to a low level during a read cycle as shown in FIG. 3. At the end of the read cycle, the timing control unit 21 initiates a write cycle automatically for a normal read-restore operation. In that manner, the binary digit read and sensed by the signal discriminator 14 is stored in an output data register 23 during a read operation and immediately restored as the time control unit 21 causes the polarity of the half-select currents to be reversed by using an inhibit timing signal from the timing control unit 21 to gate an inhibit driver 24 via an AND-gate 25 in accordance with the complementary (false) output of the data register 23. Before receiving data from he discriminator 14, the data register 23 is reset by a signal RDR. A binary 1 readout from a core then sets the data register while a binary 0 readout leaves the register in the reset state.

Operation of the timing control unit and the data register 23 is modified for clear-write operations and read-modify-write operations in the usual manner. Since the present invention relates only to read operations, irrespective of whether the read operation is to be followed by a restore operation or some other operation, such modifications will not be described. It is sufficient for the present invention to understand that the necessary delay in releasing the threshold control amplifier 22 may be achieved relative to the turn-on time of the X and Y drive currents (or of the last half-select current to be applied if both are not applied simultaneously) in a read operation by, for example, use of pulse outputs of a delay line from taps so spaced as to set and reset two control flip-flops in the appropriate sequence. One of the two control flip-flops may be provided for timing the X and Y drive currents, and the other for timing the threshold control amplifier. A third tap further downstream triggers a STROBE pulse generator and a fourth tap still further down stream may be employed to reset the two control flip-flops involved in the read operation. The READ control signal received by the timing control unit 21 from an external device, such as a sequence control unit of a digital computer, provides the control for introducing a pulse into the delay line.

The inhibit driver 24 may be a floating switch of the transformer-coupled type connected to the +V power supply. The output of the inhibit driver is connected to the center of the sense-inhibit winding 12 such that each half is driven with equal inhibit currents in the proper direction to cancel Y drive current through the selected core. The inhibit current flows through each half of the winding 12 through diodes $D_1$ and $D_2$ and through a current splitting transformer $T_1$ to ground. The diodes $D_1$ and $D_2$ assure that the transformer $T_1$ will recover rapidly. During a read operation, the inhibit driver 24 is gated off and the entire sense-inhibit winding 12 returns to OV through a bias resistor 44 connected between ground and the center of the sense inhibit winding 12.

Figure 2:
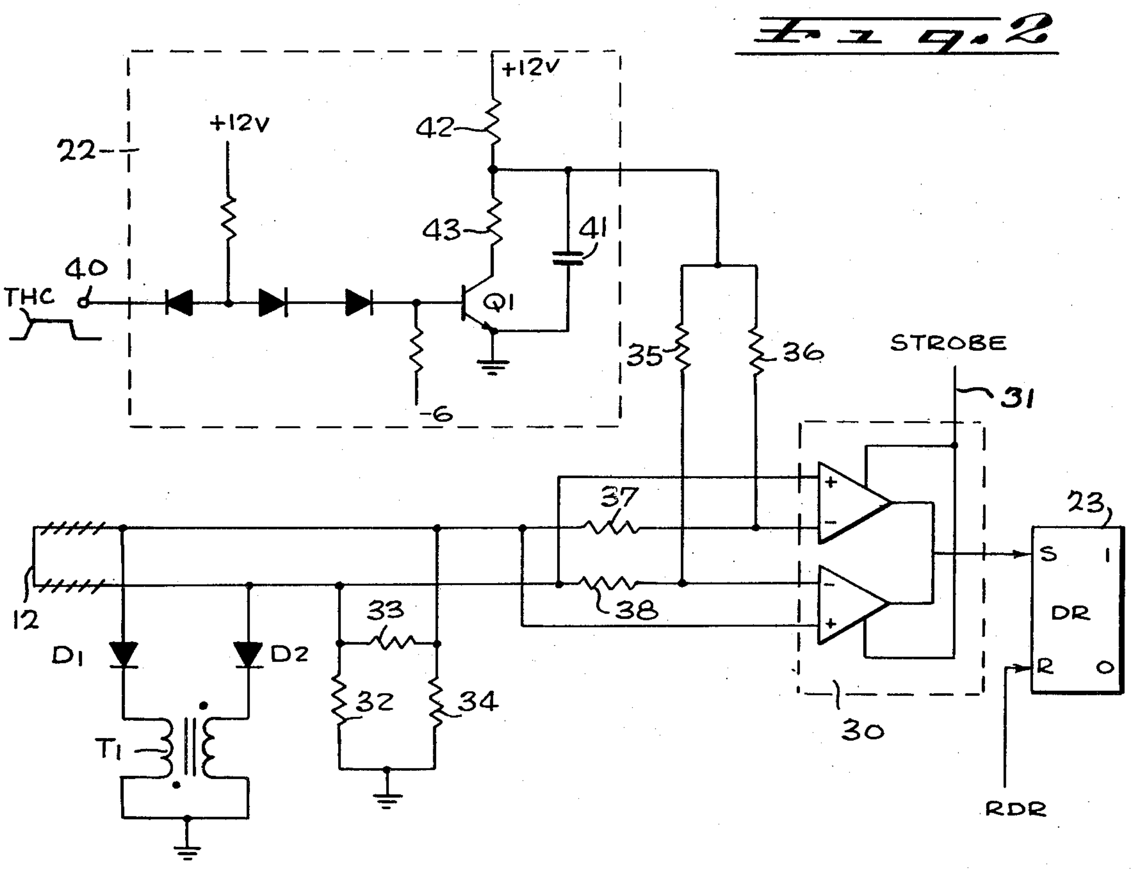
FIG. 2 shows a circuit diagram of an exemplary implementation of the present invention.

A preferred embodiment of the signal discriminator 14 will now be described with reference to FIG. 2. It comprises a dual differential voltage comparator 30 having a single output connected to the input terminal of the data register 23, and pairs of inverting (−) and noninverting (+) input terminals. A strobe input terminal 31 is connected to the timing control unit 21 (FIG. 1) to sample the signal input at a time after the threshold amplifier 22 has been turned on, and slightly before the turnover (bit-1) signal of the selected core is approximately at its peak. A unit intended to be used as a dual comparator is commercially available from integrated semiconductor circuit manufacturers such as an integrated circuit model μA711 (part No. U5F771131X) from Fairchild Semiconductor, a division of Fairchild Camera and Instrument Corporation.

When used as a signal discriminator in a core memory, the desired threshold voltage is inserted through resistors 32 through 38. Resistors 32 and 34 provide proper common mode signal termination for the winding 12 and resistor 33 provides differential signal termination while resistors 37 and 38 establish the threshold voltage at a level set by the current from the threshold amplifier control 22 through resistors 35 and 36.

It should be understood that although a dual (bipolar) comparator is shown, a conventional differential-input, differential-output amplifier may be employed with a full-wave rectifier and threshold detector. All that is required by the present invention is the ability to control the threshold level. Accordingly, for purposes of this invention, dual comparator 30 and resistors 32 through 38 are to be collectively regarded as signal discriminating means for determining when the signal across the sense winding is greater than a predetermined threshold level. It should also be understood that the present invention can be used to equal advantage in a core memory arrangement which gives an output of only one polarity for a bit 1.

The controlled voltage is provided by the threshold control amplifier 22 which has a transistor $Q_1$ biased off by zero volts at an input terminal 40 from the timing control unit 21. While the transistor $Q_1$ is turned off, a capacitor 41 is charged above level 15 (FIG. 3) by the voltage dividing action of a resistor 42 and the resistors 32 to 38. When a threshold control (THC) signal of +3 volts is transmitted by the timing control unit to the input terminal 40, the transistor $Q_1$ will conduct and the capacitor 41 will discharge through resistor 43, 42 and resistors 32 to 38 and so provide an RC time constant that the actual threshold level (voltage across each of the resistors 37 and 38) follows the locus of the optimum signal-to-noise ratio for a wide variation of core turnover (bit-1) signals and noise (delta and zero) signals. That can be determined experimentally using an oscilloscope.

The RC circuit comprising the resistors 42, 43 and the resistors 32 through 36 and capacitor 41 provide a threshold level according to the familiar equation:

$$e=K[A\cdot\epsilon-(t/RC)+B] \qquad (1)$$

where $e$ is the instantaneous threshold level; $K$ is the attenuation factor, which proportionally attenuates the voltage across the capacitor 41 to an appropriate threshold level. $K$ is given in terms of resistors by $$K=R_{38}/R_{32}+R_{35}+R_{38}=R_{37}/R_{34}+R_{36}+R_{37} \qquad (2)$$

$B$ is the voltage across the capacitor 41 after transistor $Q_1$ is on for some time. This voltage corresponds to threshold level 20 and is given by $$B=+12V\left(\frac{R_{11}}{R_{42}+R_{11}}\right) \qquad (3)$$

where $$R_{11}=\frac{R_{43}\,(R_{35}+R_{38}+R_{32})}{2R_{43}+R_{35}+R_{38}+R_{32}}$$

$A$ is the full voltage change across the capacitor 41 from turning off to turning on transistor $Q_1$ and is given by $$A=12V\left(\frac{R_{35}+R_{38}+R_{32}}{2R_{42}+R_{35}+R_{38}+R_{32}}\right)-B \qquad (4)$$

$C$ in equation (1) is the value of the capacitor 41 and $R$ is the effective resistance seen from the node where capacitor 41 is tied to resistors 42, 43, 35 and 36, and is given by $$R=\frac{2[(R_{42}\cdot R_{43})\cdot(R_{36}+R_{37}+R_{34})]}{2(R_{42}\cdot R_{43})+(R_{36}+R_{37}+R_{34})(R_{42}+R_{43})} \qquad (5)$$

From the foregoing, It should be appreciated that a method and apparatus has been disclosed for an improved technique of discriminating core turnover signals which have low signal-to-noise ratios. Although a particular environment and implementation of the invention have been described with reference to the drawings, it should be further appreciated that neither the method nor the apparatus is limited to that environment or implementation since different environments may use the present invention to equal advantage, and modifications may be required in the implementation to satisfy the needs of different environments and operating requirements. Accordingly, inasmuch as it is recognized that modifications and variations falling within the spirit of the invention will occur to those skilled in the art, it is not intended that the scope of the invention be determined by the disclosed exemplary embodiment, but rather should be determined by the breadth of the appended claims.

What is claimed is:

1. A method of improving accurate discrimination of a ferrite core signal by providing a time-dependent discriminating threshold voltage at a high level throughout initial periods during which read drive current, transmitted in at least one winding passing through said core, induces noise signals in a second winding passing through said core, and decreasing said threshold level during ensuring core turnover periods to time dependent levels substantially between the envelope of a minimum turnover signal to be expected and the envelope of maximum noise signal to be expected from a time when the noise signal has passed its peak amplitude to a time when the turnover signal has passed its peak amplitude and has reached a level substantially below the peak of a minimum amplitude noise signal to be expected.

* * * * *